(12) United States Patent
Nagaoka et al.

(10) Patent No.: US 6,361,232 B1
(45) Date of Patent: Mar. 26, 2002

(54) INPUT PEN

(75) Inventors: Toshimasa Nagaoka; Kazuhiko Ono, both of Hiratsuka (JP)

(73) Assignee: Pilot Precision Kabushiki Kaisha, Kanagawa-Ken (JP)

( * ) Notice: Subject to any disclaimer, the term of this patent is extended or adjusted under 35 U.S.C. 154(b) by 0 days.

(21) Appl. No.: 09/672,189

(22) Filed: Jan. 2, 2001

(51) Int. Cl.[7] .............................................. A47L 13/26
(52) U.S. Cl. ........................ 401/37; 401/258; 401/259; 401/260
(58) Field of Search .............................. 401/37, 21, 16, 401/195, 103, 258, 259, 260, 29, 30, 31, 32, 33

(56) References Cited

U.S. PATENT DOCUMENTS

| | | | | | |
|---|---|---|---|---|---|
| 948,832 | A | * | 2/1910 | Trotzky | 401/260 |
| 2,008,454 | A | * | 7/1935 | Klein | 401/260 |
| 5,564,850 | A | * | 10/1996 | Nagaoka | 401/37 |
| 6,227,743 | B1 | * | 5/2001 | Robb | 401/195 |

* cited by examiner

*Primary Examiner*—David J. Walczak
(74) *Attorney, Agent, or Firm*—Ladas & Parry (57) ABSTRACT

A input pen for a portable information processing terminal device with an input tip (12) biased axially forward by pressure applied thereto by a return spring (13). The pressure applied to the input tip (12) is optionally adjustable. A front barrel 10 is detachably attached to a front portion of a barrel (1). The input tip (12) is axially slidably inserted in the front barrel 10. The return spring 13 extended in the front barrel (10) applies pressure to the input tip (12) so as to bias the input tip (12) forward.

8 Claims, 7 Drawing Sheets

INPUT PEN

BACKGROUND OF THE INVENTION

1. Field of the Invention

The present invention relates to an input pen for a portable information processing terminal device, such as a PDA (personal digital assistant).

2. Description of the Related Art

An input pen employed in operating a conventional portable information processing terminal device is provided with an input tip and a tip return spring biasing the input tip forward so that the input pin is able to move backward when an excessively high pressure is applied to the input tip.

The pressure of the tip return spring, however, cannot be adjusted to adjust the force biasing the input tip longitudinally forward according to the purpose of the input pen.

Another input pen employed in a conventional portable information processing terminal device is provided with a ballpoint refill in a barrel. The replacement of the ballpoint refill contained in the barrel having a small inside diameter with another one requires very troublesome work.

SUMMARY OF THE INVENTION

It is an object of the present invention to provide an input pen capable of solving problems in the conventional input pen.

To achieve the object, according to one aspect of the present invention, an input pen for a portable information processing terminal device includes a barrel, a front barrel detachably attached to a front portion of the barrel, an input tip axially slidably fitted in the front barrel, and a return spring placed in the front barrel to apply pressure to the input tip so as to bias the input tip forward, wherein the pressure applied to the input tip by the return spring is optionally adjustable.

Since the pressure of the return spring can be optionally adjustable according to the user's preference, the input pen can be operated for input operations in an optimum condition.

According to another aspect of the present invention, an input pen for a portable information processing terminal device includes a barrel, an input tip fitted in a front portion of the barrel, a reset pin detachably attached to a front portion of the barrel, and a ballpoint refill having a writing part and detachably mounted on the reset pin, and a cap detachably put on the barrel so as to cover the writing part of the ballpoint refill. The used ballpoint refill can be replaced with a new one simply by removing the reset pin from the barrel, removing the used ballpoint refill from the reset pin and putting the new ballpoint refill on the reset pin.

DESCRIPTION OF THE PREFERRED EMBODIMENTS

Input pens in preferred embodiments according to the present invention will be described with reference to the accompanying drawings. In the following description, 'front' is 'left' in the drawings and 'back' is 'right' in the drawings.

FIGS. 1 to 4 show an input pen in a first embodiment according to the present invention. A front bushing 2 of a metal is pressed in a front portion of a barrel 1 of a metal. A reset pin 3 having a slender portion 3A is detachably screwed in the front bushing 2. An O ring 4 is placed in an annular groove 3B formed in the reset pin 3 to prevent the reset pin 3 screwed in the front bushing 2 from loosening.

Figure 1:
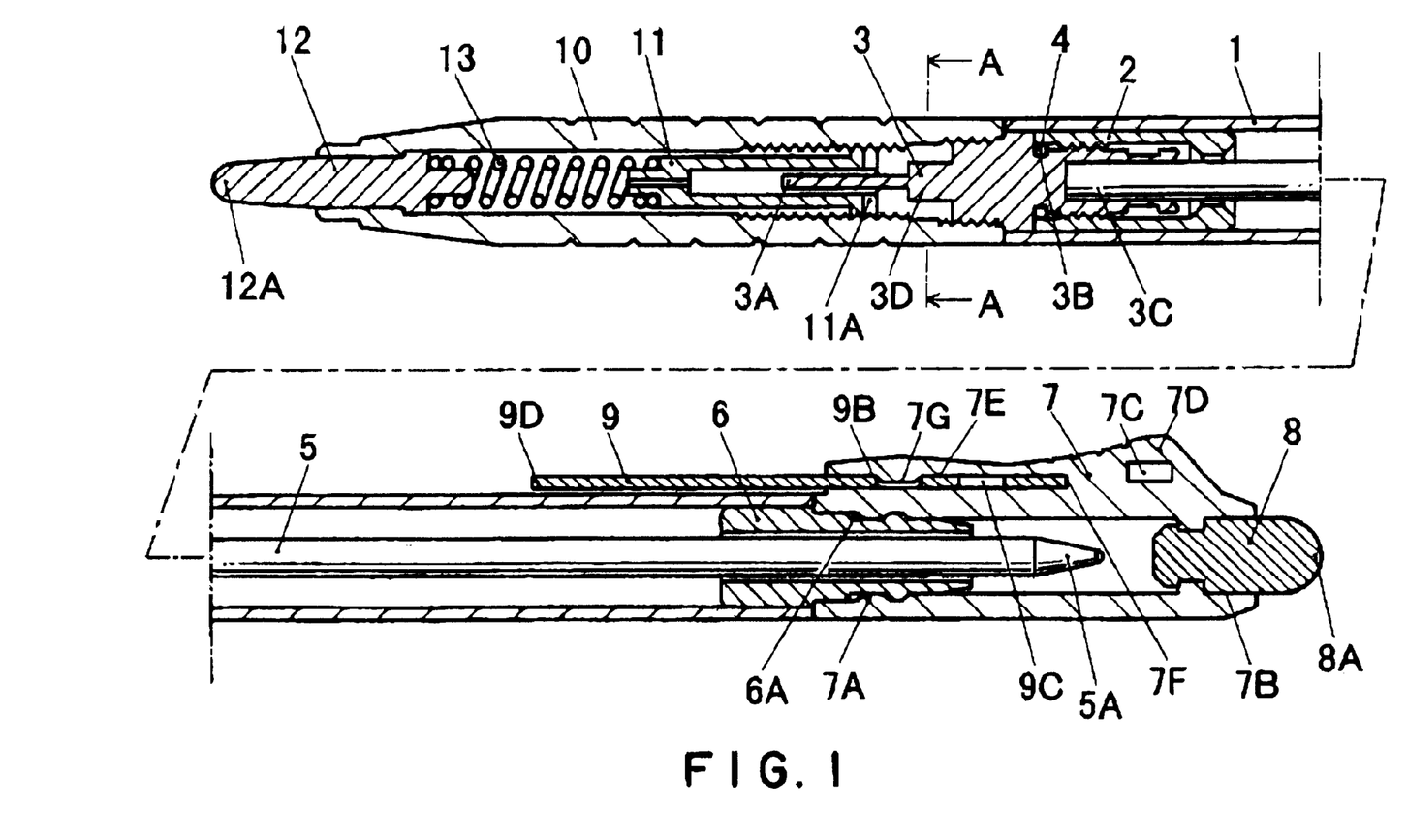
FIG. 1 is a longitudinal sectional view of an input pen in a first embodiment according to the present invention.
Figure 2:
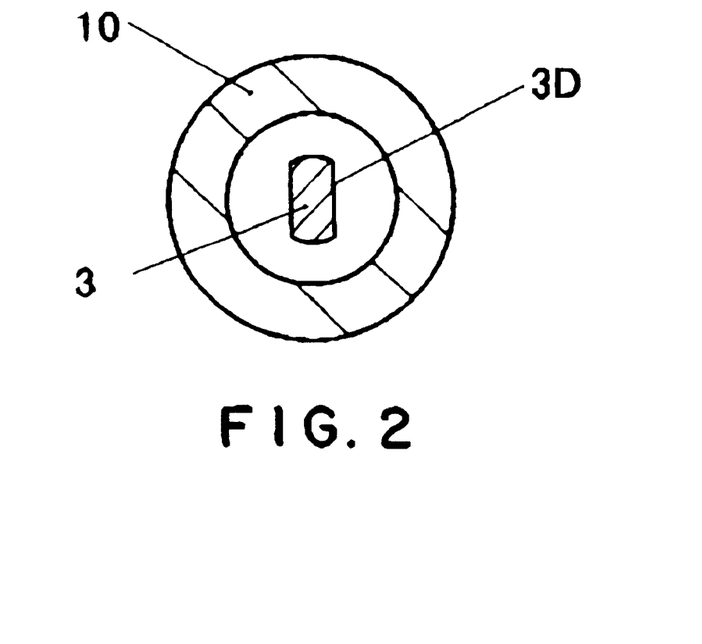
FIG. 2 is a sectional view taken on line A—A in FIG. 1.
Figure 3:
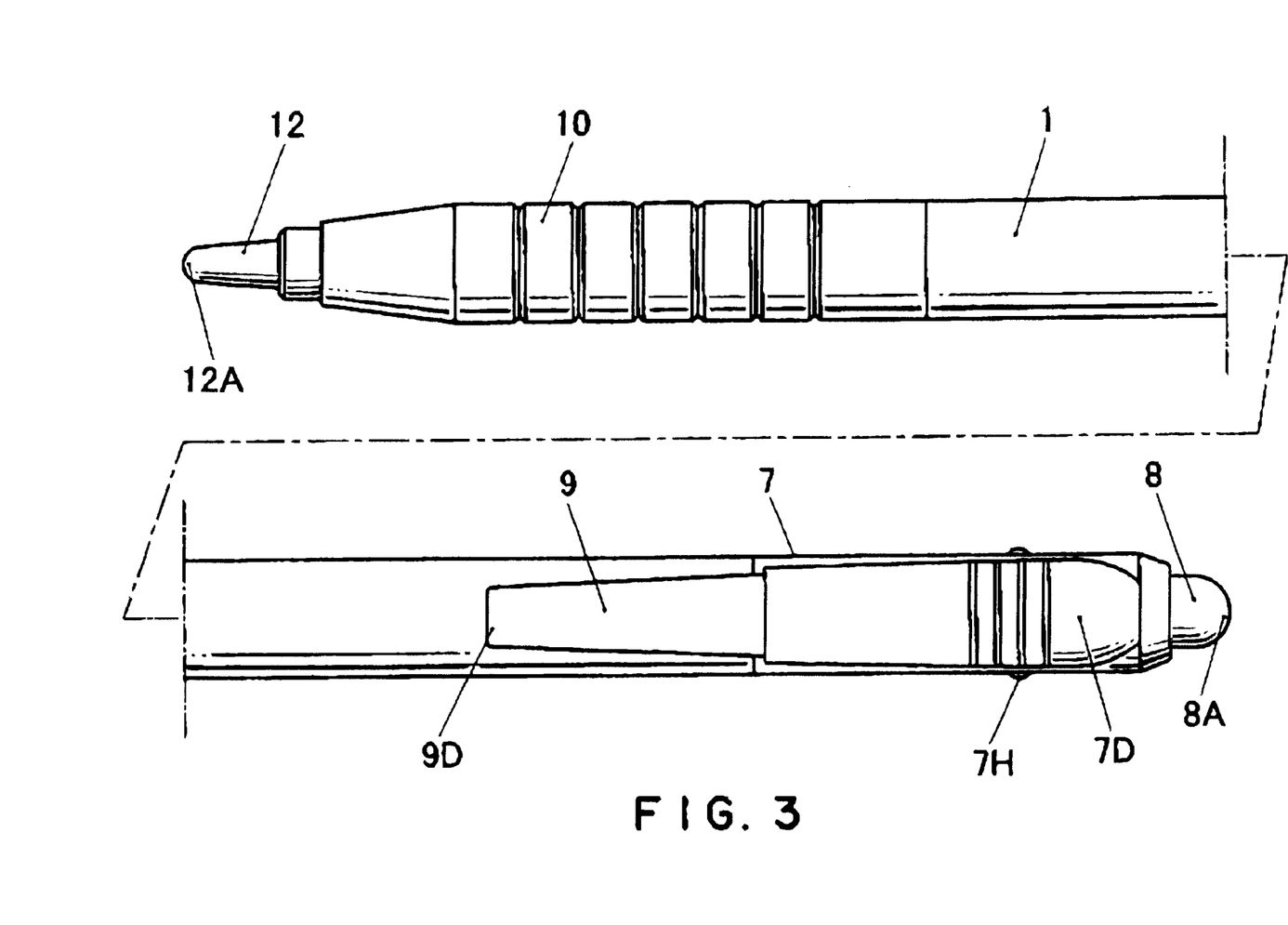
FIG. 3 is a plan view of the input pen shown in FIG. 1.
Figure 4:
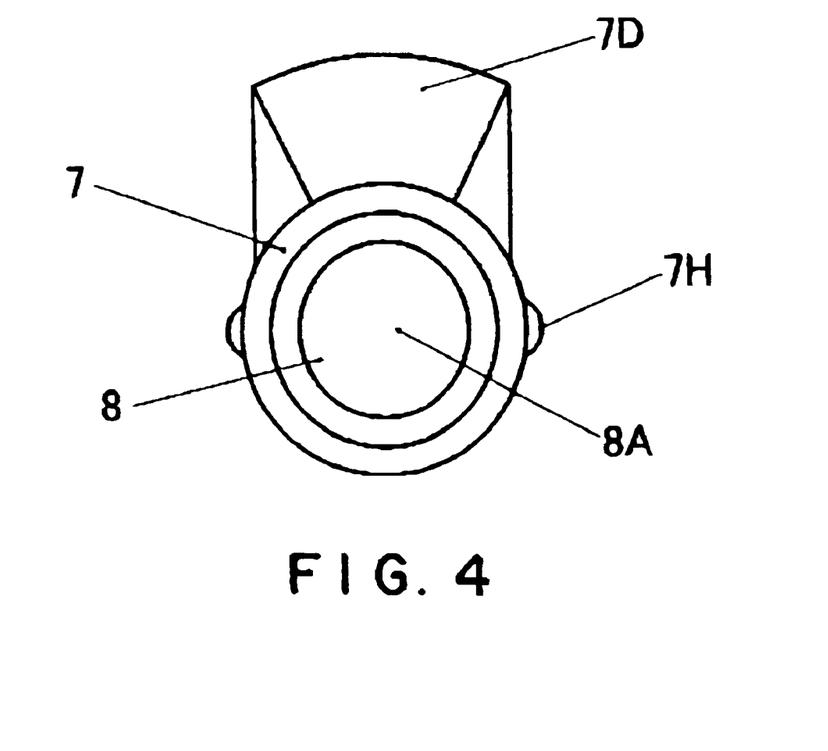
FIG. 4 is an end view of the input pen shown in FIG. 1 as viewed from the right side in FIG. 1.

The reset pin 3 is provided in its back portion with a hole 3C. A tail portion of a ballpoint refill 5 is detachably fitted in the hole 3C.

A writing head 5A of the ballpoint refill 5 projects properly from the back end of a back bushing 6. A cap 7 of a synthetic resin is detachably put on the back bushing 6 so as to cover a portion of the writing head 5A of the ballpoint refill 5 projecting from the back end of the back bushing 6. An annular ridge 7A formed on the cap 7 engages in an annular groove 6A formed in the back bushing 6 to hold the cap 7 on the back bushing 6. A soft input member 8 is fitted in a hole 7B formed in a head portion of the cap 7. The soft input member 8 has a substantially semispherical head 8A. The cap 7 is provided with a substantially rectangular hole 7C. A flat portion 3D of the reset pin 3 can be inserted in the hole 7C. The flat portion 3D is unable to turn in the hole 7C.

Figure 5:
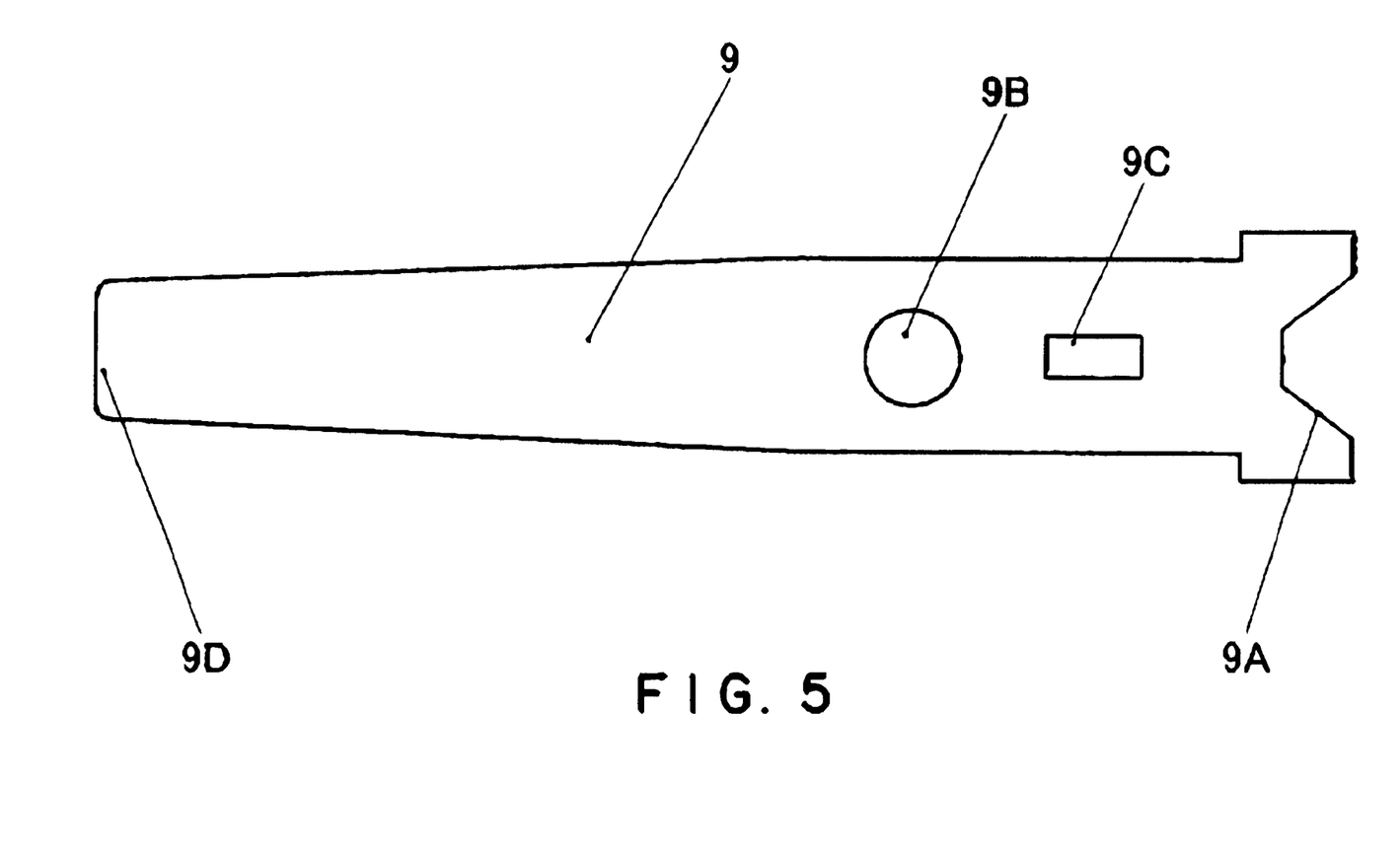
FIG. 5 is a plan view of a clip included in the input pen shown in FIG. 1.

A back portion of a clip 9 is detachably inserted in a protruded portion 7D of the cap 7. As shown in FIG. 5, a bifurcate portion 9A of the clip 9 engages a projection 7F extending forward from the bottom of a groove 7E formed in the cap 7. A protrusion 7G formed on the upper inner surface of the groove 7E of the cap 7 engages in a hole 9B formed in the clip 9 to restrain the clip 9 from movement relative to the cap 7.

Figure 6:
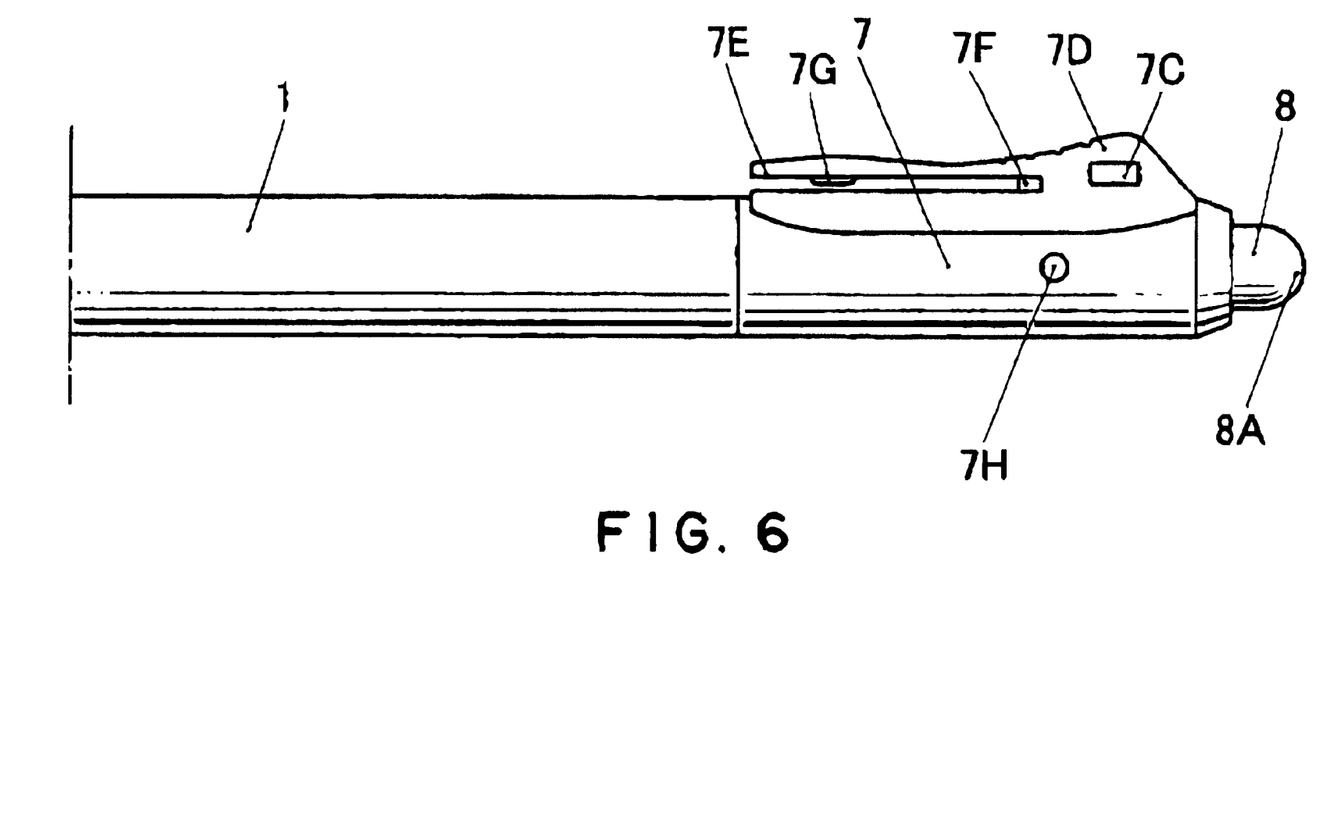
FIG. 6 is a front elevation of an essential portion of the input pen shown in FIG. 1 in a state where a clip is removed.

The input pen can be held in a pocket of a garment for carrying by the clip 9. When the clip 9 is removed from the cap 7 as shown in FIG. 6, the input pen can be held in a pocket of a garment by holding a portion of the fabric of the garment in the groove 7E of the cap 7. The protruding portion 7D of the cap 7 is formed so as to conform to the shape of a portion a finger that will be applied to the cap 7 to remove the input pen from a portable information processing terminal device to enable the finger to engage the cap 7 properly so that the input pen can be easily removed from the portable information processing terminal device. The clip is provided with a rectangular opening 9C. The flat portion 3D of the reset pin 3 can be inserted in the opening 9C. The flat portion 3D is unable to turn in the hole 9C.

Figure 7:
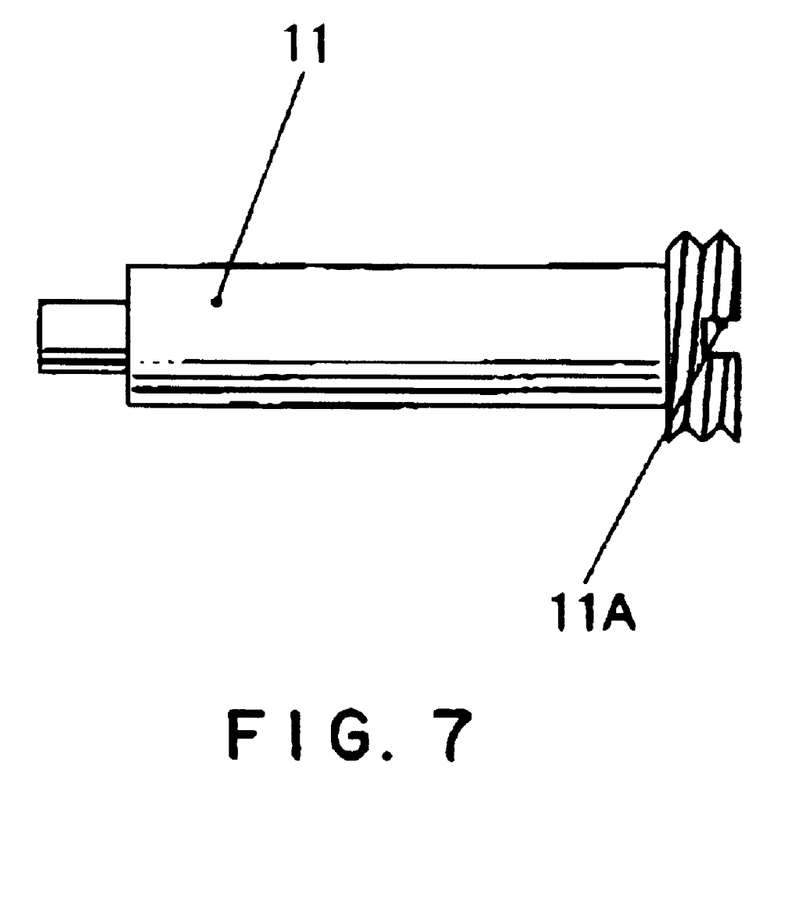
FIG. 7 is a plan view of a bearing member included in the input pen shown in FIG. 1.

A receiving member 11 is axially movably screwed in a front barrel 10 of a synthetic resin. An input tip 12 of a synthetic resin if axially slidably fitted in a front portion of the front barrel 10. A return spring 13 is extended between the receiving member 11 and the input tip 12 so as to bias the input tip 12 forward. As shown in FIG. 7, the receiving member 11 is provided in its back end surface with a slot 11A. The longitudinal position of the receiving member 11 in the front barrel 10 can be adjusted to adjust the resilience of the return spring 13 by removing the front barrel 10 and the cap 7 from the barrel 1, inserting a flat end portion 9D of the clip 9 in the slot 11A of the receiving member 11 and turning the receiving member 11 by turning the cap 7. Thus, the force biasing the input tip 12 forward can be adjusted through the adjustment of the resilience of the return spring 13. A head portion 12A of the input tip 12 is projected by a proper length from the front end of the front barrel 10.

The input pen is pressed against a touch panel included in the portable information processing terminal device to enter data into the portable information processing terminal device. The input tip 12 held in the front barrel 10 is used for entering data by writing letters with fine strokes. Thus, the input tip 12 enables minute input. Pointing can be easily achieved by using the soft input member 8. Thus, the input operation can be carried out in two input modes simply by inverting the input pen. The input pen is very handy.

If an excessively high force is exerted on the input tip 12, the input tip 12 retracts to avoid breaking the touch panel.

The resilience of the return spring 13 can be adjusted according to the purpose of the input pen or the input tip 12 can be fixed if the user desires.

Check marks and letters can be written on paper sheets with the ballpoint refill 5 by removing the cap 7 from the barrel 1. The cap 7 can be put on the front barrel 10 to avoid losing the same during writing with the ballpoint refill 5.

The cap 7 is provided with projections 7H at diametrically opposite positions on the outer surface thereof. The projections 7H engages the portable information processing terminal device to hold the input pen on the portable information processing terminal device.

When the portable information processing terminal device malfunctions and needs resetting, the front barrel 10 is separated from the barrel 1 to expose the reset pin 3 and the portable information processing terminal device can be reset with the reset pin 3, which is very convenient.

When replacing the used ballpoint refill 5 with a new one, the front barrel 10 is separated from the barrel 1, the cap 7 is removed from the barrel 1, and the flat portion 3D of the reset pin 3 is inserted in the hole 7C of the cap 7, and the cap 7 is turned to remove the reset pin 3 from the barrel 1. Then, the used ballpoint refill 5 is taken out from the barrel 1.

The reset pin 3 can be removed from the barrel 1 also by removing the clip 9 from the cap 7, inserting the flat portion 3D of the reset pin 3 in the hole 9C of the clip 9 and turning the clip 9. The ballpoint refill 5 is removed together with the reset pin 3 from the barrel 1. The used ballpoint refill 5 is pulled out of the hole 3C of the reset pin 3. A tail portion of a new ballpoint refill is fitted in the hole 3C of the reset pin 3, the new ballpoint refill is inserted in the barrel 1 and the reset pin 3 is screwed in the front bushing 2.

The synthetic resin forming the input tip 12 is polyacetal, polyethylene, nylon or the like.

The material forming the soft input member 8 is vulcanized rubber or a thermoplastic elastomer.

Figure 8:
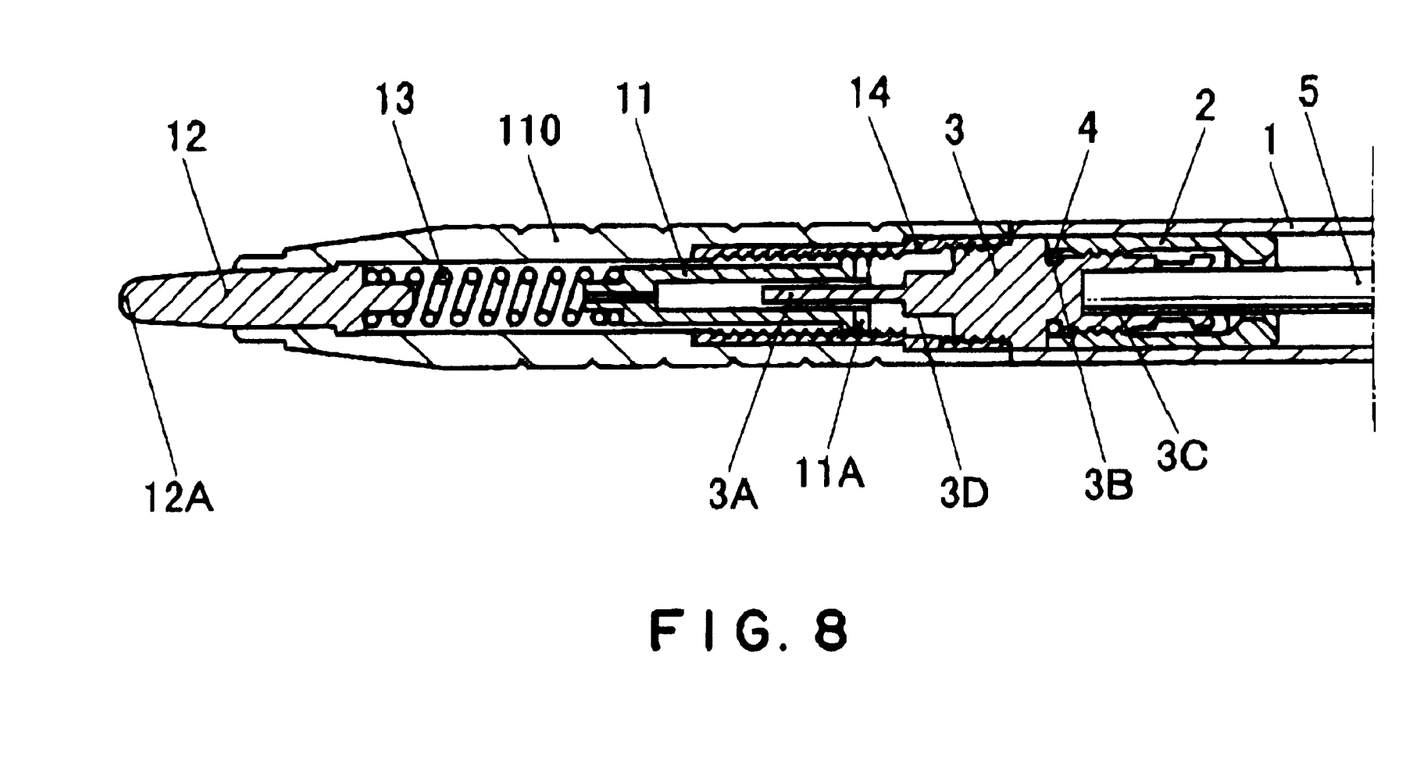
FIG. 8 is a longitudinal sectional view of an essential portion of an input pen in a second embodiment according to the present invention.

An input pen in a second embodiment according to the present invention will be described with reference to FIG. 8, in which parts like or corresponding to those shown in FIG. 1 are denoted by the same reference characters and the description thereof will be omitted. An internally threaded bushing 14 is fixedly pressed in a back portion of a front barrel 110 of a synthetic resin, and a reset pin 3 is detachably screwed in the internally threaded bushing 14. A receiving member 11 is axially movably screwed in the internally threaded bushing 14.

As apparent from the foregoing description, according to the present invention, the resilience of the return spring can be adjusted according to the preference of the user and hence the user is able to operate the input pen in an optimum condition.

The used ballpoint refill can be replaced with a new one simply by removing the reset pin from the barrel, separating the used ballpoint refill from the reset pin and putting the new ballpoint refill on the reset pin.

What is claimed is:

1. An input pen for a portable information processing terminal device, said input pen comprising:
    a barrel;
    a front barrel detachably attached to a front portion of the barrel;
    an input tip axially slidably fitted in the front barrel;
    a return spring placed in the front barrel to apply pressure to the input tip so as to bias the input tip forward;
    a ballpoint refill having a writing part and being mounted in the barrel, the writing part protruding from a rear end of the barrel; and
    a cap detachably disposed on the barrel so as to cover the writing part of the ballpoint refill,
    wherein the pressure applied to the input tip by the return spring is optionally adjustable.

2. The input pen according to claim 1, wherein the cap has a head and is provided in the head portion with a soft input member.

3. The input pen according to claim 1 further comprising a clip attached detachably to the cap.

4. The input pen according to claim 1 further comprising a receiving member screwed in a back portion of the front barrel;
    wherein the return spring is extended between the input tip and the receiving member to bias the input tip axially forward, and
    the pressure applied to the input tip by the return spring is adjusted by turning the receiving member to move the same axially in the front barrel.

5. The input pen according to claim 4 further comprising an internally threaded bushing fixedly pressed in a back portion of the front barrel;
    wherein the receiving member is screwed in the internally threaded bushing.

6. The input pen according to claim 5, wherein a slot is formed in a rear end surface of the receiving member, and the receiving member is moved axially by fitting a tip portion of a clip in the slot and turning the clip.

7. The input pen according to claim 4, wherein a slot is formed in a rear end surface of the receiving member, and the receiving member is moved axially by fitting a tip portion of a clip in the slot and turning the clip.

8. The input pen according to claim 1 further comprising a reset pin detachably attached to the front portion of the barrel; and
    wherein said ballpoint refill is detachably mounted on the reset pin.

* * * * *

UNITED STATES PATENT AND TRADEMARK OFFICE
CERTIFICATE OF CORRECTION

PATENT NO. : 6,361,232 B1
DATED : March 26, 2002
INVENTOR(S) : Toshimasa Nagaoka et al.

It is certified that error appears in the above-identified patent and that said Letters Patent is hereby corrected as shown below:

<u>Title page,</u>
Item [22], should read -- [22] Filed: September 28, 2000 --

Signed and Sealed this

Twenty-eighth Day of January, 2003

JAMES E. ROGAN
*Director of the United States Patent and Trademark Office*